United States Patent
Chang et al.

(10) Patent No.: US 9,825,454 B2
(45) Date of Patent: Nov. 21, 2017

(54) PROTECTION DEVICE AND METHOD FOR ELECTRONIC DEVICE

(71) Applicant: Wistron Corporation, New Taipei (TW)

(72) Inventors: Chao-Hsin Chang, New Taipei (TW); Meng-Jeong Pan, New Taipei (TW)

(73) Assignee: Wistron Corporation, New Taipei (TW)

( * ) Notice: Subject to any disclaimer, the term of this patent is extended or adjusted under 35 U.S.C. 154(b) by 133 days.

(21) Appl. No.: 14/607,087

(22) Filed: Jan. 28, 2015

(65) Prior Publication Data

US 2016/0072274 A1 Mar. 10, 2016

(30) Foreign Application Priority Data

Sep. 5, 2014 (TW) .............................. 103130902 A (51) Int. Cl.
*H02H 3/00* (2006.01)
*H02H 3/38* (2006.01)
(Continued)

(52) U.S. Cl.
CPC .............. *H02H 3/38* (2013.01); *H02H 3/087* (2013.01); *H02H 11/003* (2013.01)

(58) Field of Classification Search
CPC ................................. H02H 3/087; H02H 3/38
(Continued)

(56) References Cited

U.S. PATENT DOCUMENTS

| 5,534,788 A * | 7/1996 | Smith .................... G01R 1/203 174/260 |
| 5,862,301 A * | 1/1999 | Gontowski, Jr. ......... H02P 1/26 318/632 |

(Continued)

FOREIGN PATENT DOCUMENTS

| CN | 102790373 A | 11/2012 |
| CN | 102842885 A | 12/2012 |

(Continued)

OTHER PUBLICATIONS

Office action dated Dec. 1, 2015 for the Taiwan application No. 103130902, filing date: Sep. 5, 2014, p. 2 line 4-26, p. 3 and p. 4 line 1-24.

(Continued)

*Primary Examiner* — Stephen W Jackson
(74) *Attorney, Agent, or Firm* — Winston Hsu (57) ABSTRACT

A protection device for protecting an electronic device includes a current sensing module, for detecting a current flowing through a power supply path of the electronic device to generate a current signal; a processing device, coupled to the current sensing module, for receiving the current signal to determine whether the current corresponding to the current signal is greater than a first threshold value and outputting a control signal accordingly; a first switch, disposed on the power supply path, for controlling the power supply path to be switched on or off according to an input voltage of the power supply path; and a first control module, coupled to the processing device and the first switch, for controlling the first switch to be turned on or off according to the control signal outputted by the processing device, in order to control the power supply path to be switched on or off.

16 Claims, 6 Drawing Sheets

(51) Int. Cl.
*H02H 3/087* (2006.01)
*H02H 11/00* (2006.01)

(58) Field of Classification Search
USPC .......................................................... 361/90
See application file for complete search history.

(56) References Cited

U.S. PATENT DOCUMENTS

| | | | |
|---|---|---|---|
| 8,531,810 B2 | 9/2013 | Huang | |
| 8,792,220 B2 | 7/2014 | Wang | |
| 2004/0150927 A1* | 8/2004 | Strayer | H02H 11/003 361/82 |
| 2012/0293902 A1* | 11/2012 | Huang | H02H 3/087 361/93.7 |

FOREIGN PATENT DOCUMENTS

| | | |
|---|---|---|
| TW | 525862 | 3/2003 |
| TW | 525862 U | 3/2003 |
| TW | 201249041 | 12/2012 |

OTHER PUBLICATIONS

Office action dated Aug. 1, 2017 for China application No. 201410494319.4, filing date Sep. 24, 2014, p. 3 line 4-36, p. 4-7 and p. 8 line 1.

* cited by examiner

PROTECTION DEVICE AND METHOD FOR ELECTRONIC DEVICE

BACKGROUND OF THE INVENTION

1. Field of the Invention

The present invention relates to a protection device and method for an electronic device, and more particularly, to a protection device and method capable of integrating the over-current protection, over-voltage protection and negative voltage protection functionalities for an electronic device.

2. Description of the Prior Art

In modern society with advanced information, people desire to catch various types of information anytime and anywhere, and various portable electronic devices, such as laptops, personal digital assistants (PDA), mobile phones, smart phones, emerge as the times require. In order to process a large amount of data while remaining a small size, there may be sophisticated and complex circuits with high integration inside the portable electronic devices. The internal circuits can normally operate only when provided with a predetermined direct current (DC) bias voltage. A DC voltage exceeding this predetermined voltage or an erroneously inverse DC voltage may damage the sophisticated circuits and disable the circuits. In addition, since the internal circuit elements have limited loading current capability, the internal circuits may be burnt if an incoming current exceeds the current limit of the circuit elements, which causes that the portable electronic devices may fail to operate properly.

In order to prevent the internal circuits from being damaged by the improper bias voltage or current, a general portable electronic device may be equipped with a protection circuit for protecting the internal circuit elements. The conventional over-voltage or negative voltage protection circuit cannot simultaneously provide over-current protection functions; hence, the portable electronic device should be externally connected to a positive temperature coefficient (PTC) thermistor or recoverable fuse for over-current protection. However, the PTC thermistor and the recoverable fuse have a greater internal resistance, which may generate a high temperature after the protection circuits are switched on and off many times. When the system has a larger load, the current flowing through the PTC thermistor or recoverable fuse may increase and generate a greater voltage drop, which easily generates an evil influence on the system. Thus, there is a need for improvement over the prior art.

SUMMARY OF THE INVENTION

It is therefore an objective of the present invention to provide a protection device and method for an electronic device capable of integrating the over-current protection, over-voltage protection and negative voltage protection functionalities.

The present invention discloses a protection device for protecting an electronic device. The protection device comprises a current sensing module, for detecting a current flowing through a power supply path of the electronic device to generate a current signal; a processing device, coupled to the current sensing module, for receiving the current signal to determine whether the current corresponding to the current signal is greater than a first threshold value and outputting a control signal accordingly; a first switch, disposed on the power supply path, for controlling the power supply path to be switched on or off according to an input voltage of the power supply path; and a first control module, coupled to the processing device and the first switch, for controlling the first switch to be turned on or off according to the control signal outputted by the processing device, in order to control the power supply path to be switched on or off.

The present invention further discloses a protection method for an electronic device. The protection method comprises detecting a current flowing through a power supply path of the electronic device to generate a current signal; determining whether the current corresponding to the current signal is greater than a first threshold value according to the current signal, and outputting a control signal accordingly; controlling, by a first switch, the power supply path to be switched on or off according to an input voltage of the power supply path; and controlling the first switch to be turned on or off via the control signal, in order to control the power supply path to be switched on or off.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
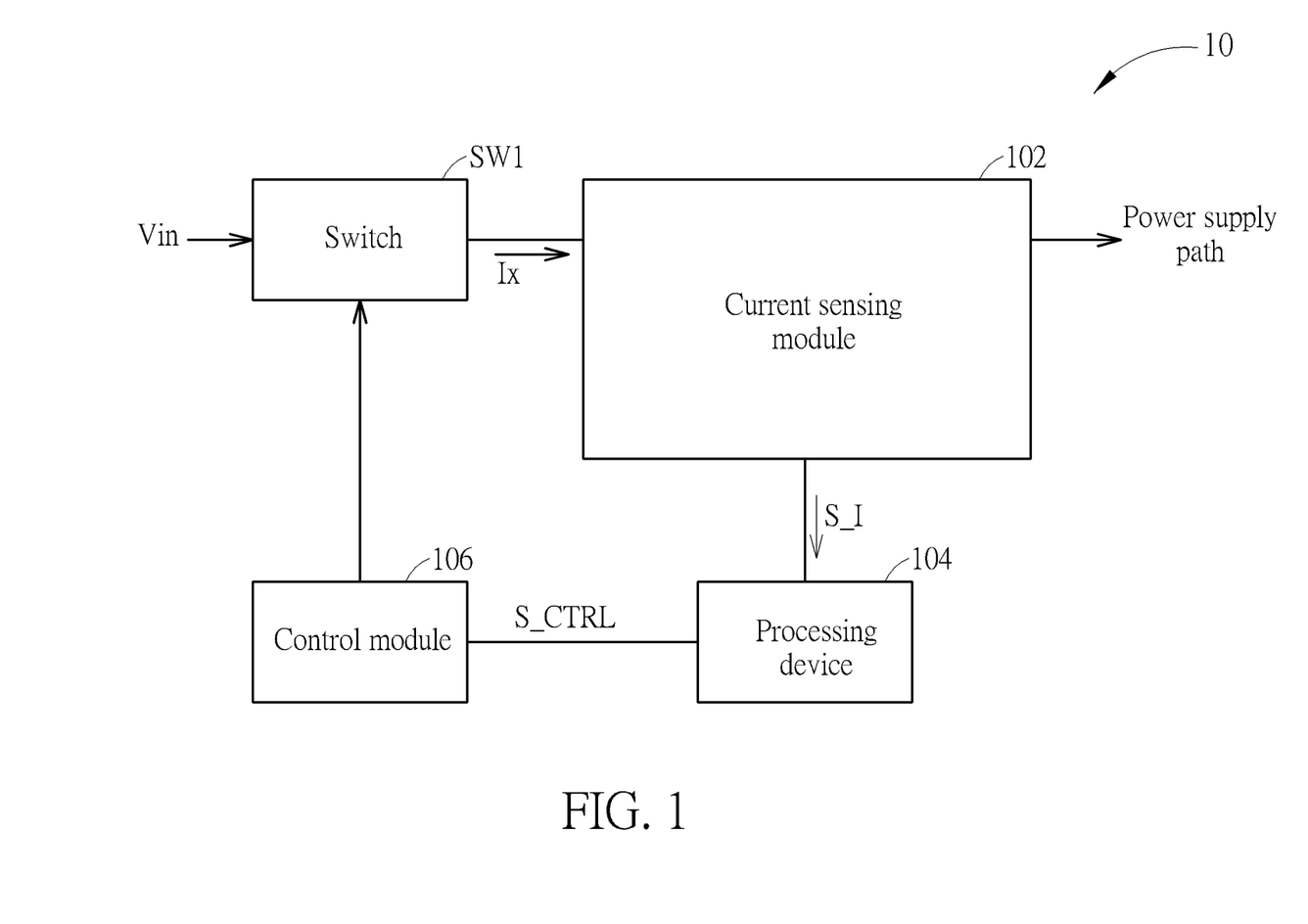
FIG. 1 is a schematic diagram of a protection device according to an embodiment of the present invention.

Please refer to FIG. 1, which is a schematic diagram of a protection device 10 according to an embodiment of the present invention. The protection device 10 may perform over-current protection and negative voltage protection on an electronic device. As shown in FIG. 1, the protection device 10 includes a current sensing module 102, a processing device 104, a control module 106 and a switch SW1. The current sensing module 102 is utilized for detecting a current Ix flowing through a power supply path of the electronic device to generate a current signal S_I. The processing device 104, coupled to the current sensing module 102, is utilized for receiving the current signal S_I to determine whether the current Ix corresponding to the current signal S_I is greater than a threshold value, and outputting a control signal S_CTRL accordingly. The processing device 104 may be a central processing unit (CPU), a microprocessor, a micro controller unit (MCU), a complex programmable logic device (CPLD) or other type of processing device. The switch SW1, disposed on the power supply path of the electronic device, may control the power supply path to be switched on or off according to an input voltage Vin of the power supply path. The control module 106, coupled to the processing device 104 and the switch SW1, may control the switch SW1 to be turned on or off according to the control signal S_CTRL outputted by the processing device 104, in order to control the power supply path to be switched on or off.

More specifically, the switch SW1 itself may control the power supply path to be switched on or off according to the input voltage Vin of the power supply path, in order to provide negative voltage protection for the electronic device. The control module 106 may control the switch SW1 to be turned on or off according to the control signal S_CTRL corresponding to the current Ix, to control the power supply path to be switched on or off, in order to provide over-current protection for the electronic device. In such a situation, negative voltage protection and over-current protection can share the same switch SW1, so that the required numbers and area of circuit elements can be reduced, which further reduces the cost.

Preferably, the switch SW1 may be realized by applying a p-type metal oxide semiconductor field-effect transistor (PMOS) P1. The drain and source of the PMOS P1 may be realized as the two terminals for passing the current Ix in the switch SW1, and the gate of the PMOS P1 may be realized as a control terminal of the switch SW1. In such a situation, a lower voltage signal in the control terminal may turn on the switch SW1, and a higher voltage signal in the control terminal may turn off the switch SW1. More specifically, the switch SW1 may be turned on when the voltage of the control terminal minus the input voltage Vin is smaller than the threshold voltage of the PMOS P1, and may be turned off when the voltage of the control terminal minus the input voltage Vin is greater than the threshold voltage of the PMOS P1. As a result, the PMOS P1 may realize the negative voltage protection in the switch SW1. If the voltage of the control terminal of the switch SW1 is zero, the switch SW1 may be turned on only when the input voltage yin is greater than the threshold voltage. If the input voltage Vin is a negative voltage, the switch SW1 may be turned off, which prevents the negative voltage from entering the electronic device to damage the circuit elements inside.

Figure 2:
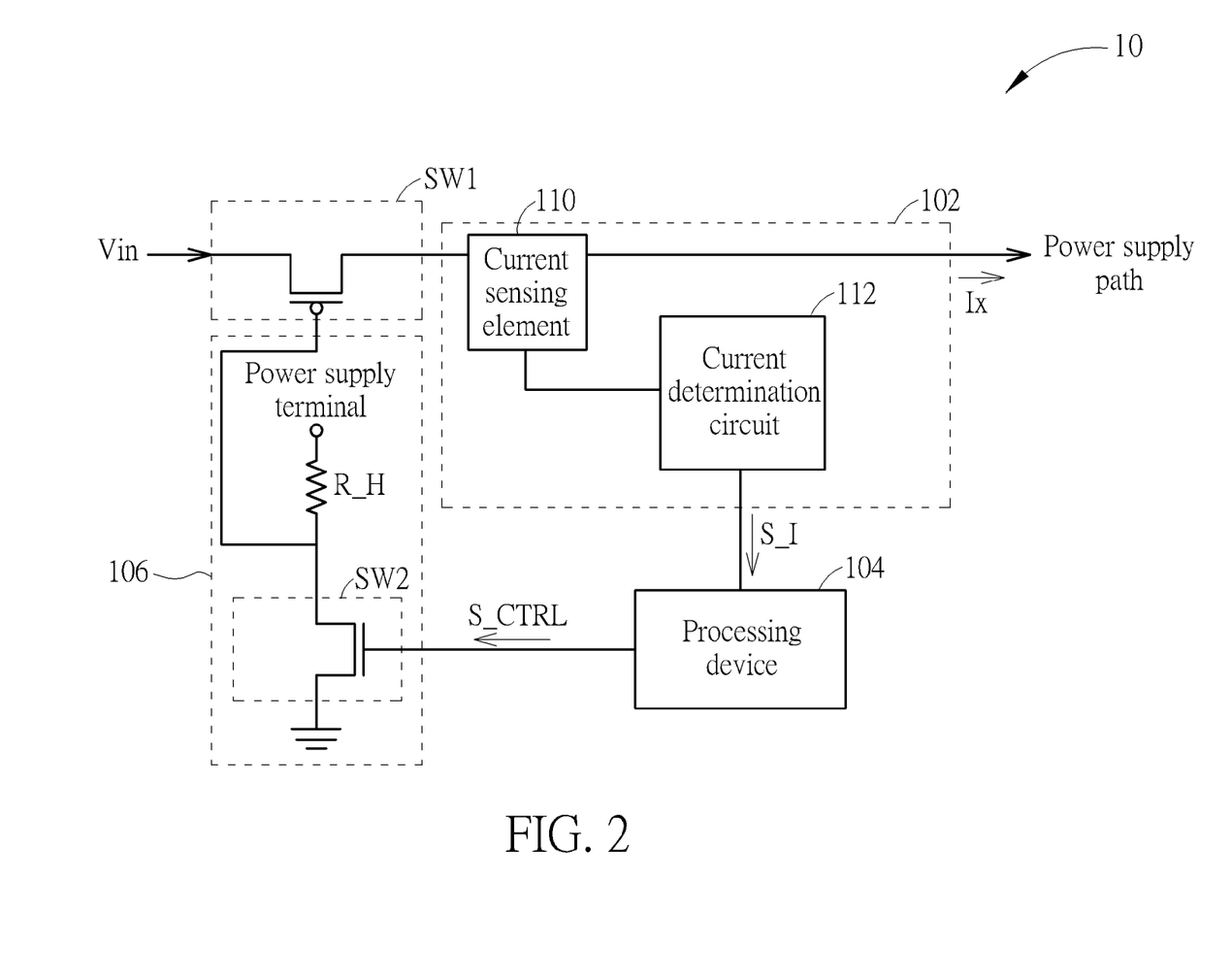
FIG. 2 is a schematic diagram of an implementation of the protection device shown in FIG. 1.

In an embodiment, the current sensing module 102 may be realized by using a current sensing element and a current determination circuit. Please refer to FIG. 2, which is a schematic diagram of an implementation of the protection device 10. As shown in FIG. 2, the current sensing module 102 includes a current sensing element 110 and a current determination circuit 112. The current sensing element 110, disposed on the power supply path, is utilized for detecting the current Ix flowing through the power supply path. The current determination circuit 112, coupled to the current sensing element 110, is utilized for generating the current signal S_I according to the current Ix detected by the current sensing element 110. Preferably, the current sensing element 110 may be realized by using a low resistance chip resistor. Since the current sensing element 110 is located on the power supply path for detecting the current of the power supply path, the low resistance chip resistor having a smaller internal resistance may prevent a large voltage drop in the output terminal when the current is excessively large. In addition, in comparison with the prior art where the positive temperature coefficient (PTC) thermistor or the recoverable fuse is easily influenced by temperature, the internal resistance of the low resistance chip resistor is not easily influenced by temperature, so that an excessive voltage drop may not occur even if the electronic device undergoes long usage or a lot of switches causing its temperature to rise.

On the other hand, the control module 106 includes a switch SW2 and a pull-high resistor R_H. The switch SW2 may receive the control signal S_CTRL. When the control signal S_CTRL turns on the switch SW2, the control module 106 may output a low-voltage-level signal to the control terminal of the switch SW1 in order to turn on the switch SW1, which in turn controls the power supply path of the electronic device to be switched on. When the control signal S_CTRL turns off the switch SW2, the pull-high resistor R_H may control the control module 106 to output a high-voltage-level signal to the control terminal of the switch SW1 in order to turn off the switch SW1, which in turn controls the power supply path of the electronic device to be switched off.

In detail, the switch SW2 may be realized by applying an n-type metal oxide semiconductor field-effect transistor (NMOS) N2. The drain and source of the NMOS N2 may be coupled to the control terminal of the switch SW1 and a ground terminal, respectively, and the gate of the NMOS N2 may be coupled to the processing device 104 to receive the control signal S_CTRL. Both terminals of the pull-high resistor R_H may be coupled to the control terminal of the switch SW1 and a power supply terminal, respectively. In such a situation, if the control signal S_CTRL has a higher voltage level, the control signal S_CTRL may control the NMOS N2 to be turned on, so that the control module 106 may output a low-voltage-level signal to the control terminal of the switch SW1 (i.e., the control terminal of the switch SW1 is connected to the ground terminal), in order to turn on the switch SW1. If the control signal S_CTRL has a lower voltage level, the control signal S_CTRL may control the NMOS N2 to be turned off; at this moment, the pull-high resistor R_H may pull up the voltage level of the control terminal of the switch SW1 to allow this voltage level to be the same with the voltage level of the power supply terminal (substantially equal to the input voltage Vin), in order to turn off the switch SW1.

The processing device 104 may configure a threshold value TH_I for over-current protection, in order to turn off the switch SW1 to achieve an over-current protection effect when the current Ix exceeds the threshold value TH_I. In detail, when the current Ix is smaller than the threshold value TH_I (i.e., under a normal operation), the processing device 104 may output the control signal S_CTRL with a higher voltage level, which instructs the control module 106 to output the low-voltage-level signal to turn on the switch SW1. When the current Ix is greater than the threshold value TH_I (i.e., an occurrence of over-current), the processing device 104 may output the control signal S_CTRL with a lower voltage level, which instructs the control module 106 to output the high-voltage-level signal to turn off the switch SW1, in order to switch off the power supply path of the electronic device. As a result, the excessive current may not enter the electronic device to damage the circuit elements inside, and the over-current protection can thereby be achieved.

Figure 3:
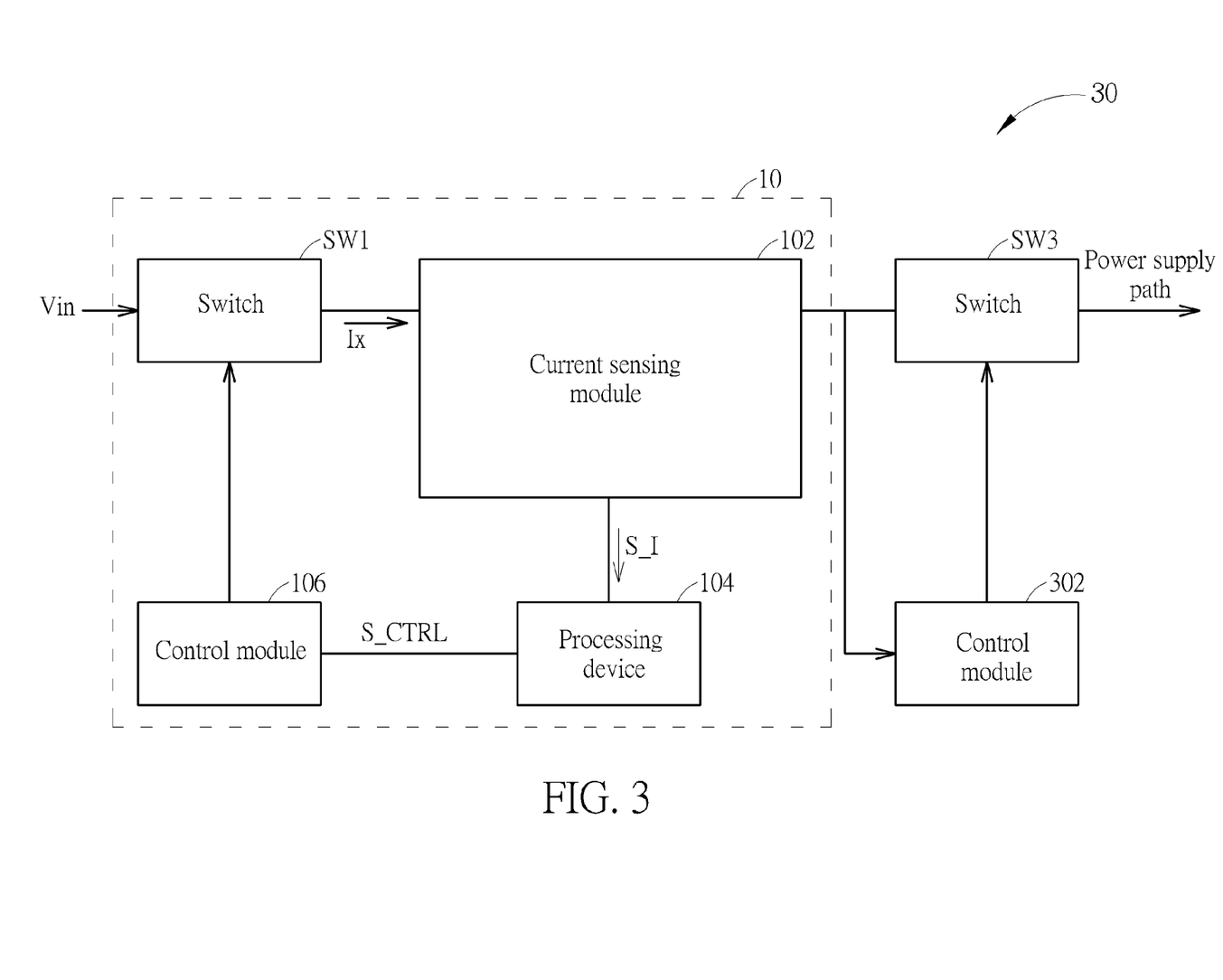
FIG. 3 is a schematic diagram of a protection device according to an embodiment of the present invention.

In another embodiment, an over-voltage protection device may be included in the protection device of the present invention, in order to obtain a more complete protection. Please refer to FIG. 3, which is a schematic diagram of a protection device 30 according to an embodiment of the present invention. As shown in FIG. 3, the structure of the protection device 30 is similar to that of the protection device 10 shown in FIG. 1, so the modules, elements and signals having the same functions are denoted by the same symbols. In addition to the structure of the protection device 10, the protection device 30 further includes a switch SW3 and a control module 302. The switch SW3, disposed on the power supply path of the electronic device, is utilized for controlling the power supply path to be switched on or off.

The control module 302, coupled to the switch SW3, is utilized for controlling the switch SW3 to be turned on or off according to the input voltage Vin of the power supply path.

Preferably, the switch SW3 may be realized by applying a PMOS P3. The drain and source of the PMOS P3 may be realized as the two terminals for passing the current Ix in the switch SW3, and the gate of the PMOS P3 may be realized as a control terminal of the switch SW3. In such a situation, a lower voltage signal in the control terminal may turn on the switch SW3, and a higher voltage signal in the control terminal may turn off the switch SW3. More specifically, the switch SW3 may be turned on when the voltage of the control terminal minus the input voltage Vin is smaller than the threshold voltage of the PMOS P3, and may be turned off when the voltage of the control terminal minus the input voltage Vin is greater than the threshold voltage of the PMOS P3.

According to the operations of the control module 302 and the switch SW3, when the input voltage Vin of the power supply path of the electronic device is higher than a threshold value TH_V, the control module 302 may turn off the switch SW3 to control the power supply path to be switched off, in order to prevent an excessively large voltage from entering the electronic device to damage the circuit elements inside. When the input voltage Vin is lower than the threshold value TH_V, the control module 302 may turn on the switch SW3, so that the power supply path may be switched on and operated normally.

Figure 4:
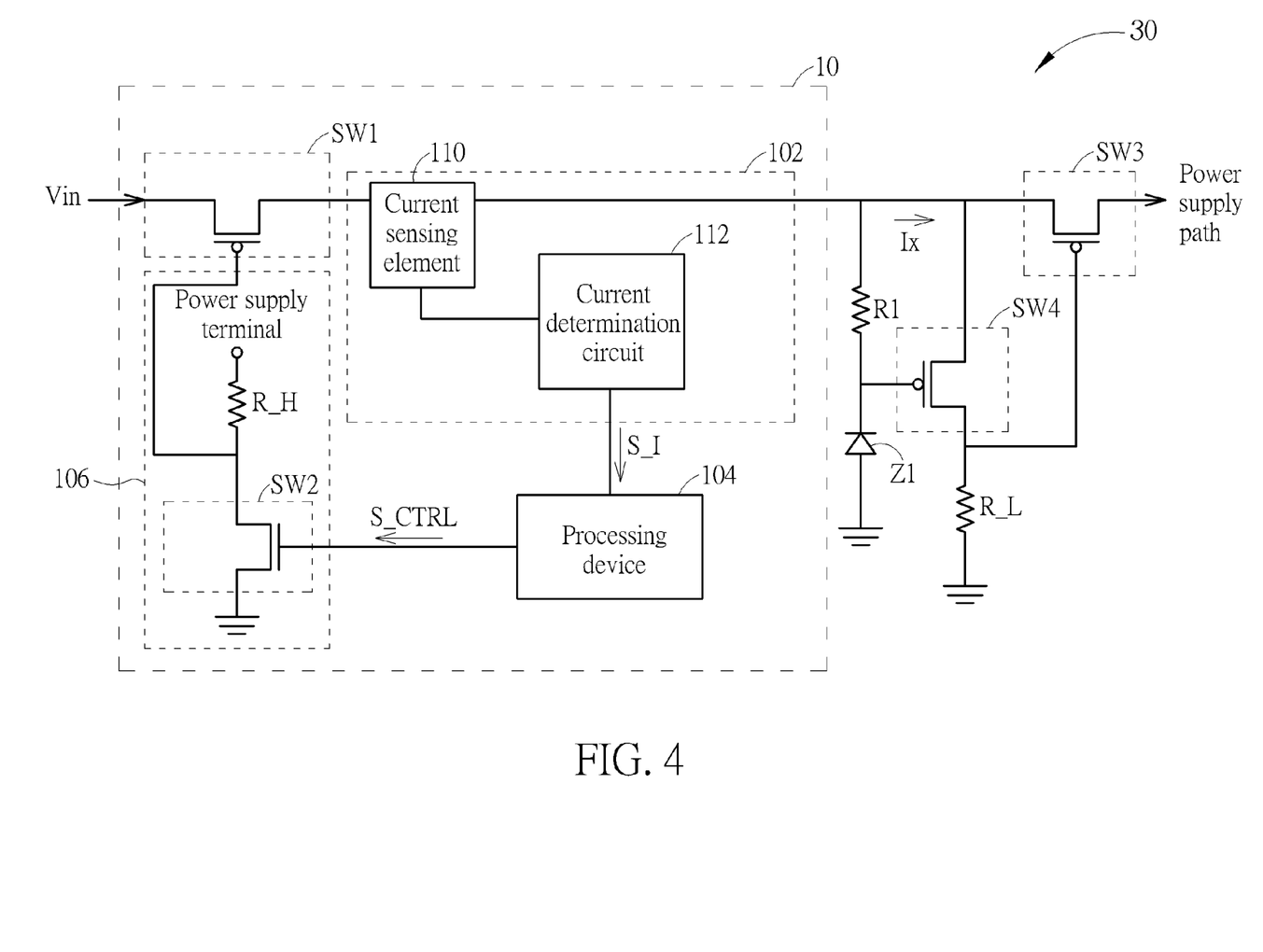
FIG. 4 is a schematic diagram of an implementation of the protection device shown in FIG. 3.

In an embodiment, the control module 302 may be realized by using a pull-low resistor and a diode. Please refer to FIG. 4, which is a schematic diagram of an implementation of the protection device 30. As shown in FIG. 4, the control module 302 includes a switch SW4, a diode Z1, a pull-low resistor R_L and a resistor R1. The switch SW3 is realized by applying the PMOS P3. The switch SW4 is utilized for receiving the input voltage Vin, and controlling the control module 302 to output the high-voltage-level signal when an over-voltage occurs in order to turn off the switch SW4, which in turn controls the power supply path of the electronic device to be switched off. The diode Z1, coupled to a control terminal of the switch SW4, is utilized for clamping the voltage of the control terminal. The diode Z1 may be a zener diode or other type of diode, which is not limited herein. The pull-low resistor R_L may control the control module 302 to output the low-voltage-level signal in order to turn on the switch SW3, which in turn controls the power supply path of the electronic device to be switched on. In addition, other modules, elements and signals of the protection device 30 shown in FIG. 4 have similar functions with those of the protection device 10 shown in FIG. 2, and thus are denoted by the same symbols.

In detail, the switch SW4 may be realized by applying a PMOS P4. The drain and source of the PMOS P4 may be coupled to the control terminal of the switch SW3 and the power supply path of the electronic device, respectively, and the gate of the PMOS P4 may be coupled to the diode Z1 where the diode Z1 may clamp the gate voltage. Both terminals of the pull-low resistor R_L may be coupled to the control terminal of the switch SW1 and the ground terminal, respectively. In such a situation, if the input voltage Vin is a normal voltage, the diode Z1 may not be turned on, so that the voltage levels of the source and gate of the PMOS P4 may be substantially equal; hence, the switch SW4 formed by the PMOS P4 may be turned off. At this moment, the pull-low resistor R_L may pull down the voltage level of the control terminal of the switch SW3 to make this voltage level the same with the voltage level of the ground terminal (substantially equal to zero), in order to turn on the switch SW3. On the other hand, if the input voltage Vin is too high, the source voltage of the PMOS P4 may rise accordingly. At this moment, the diode Z1 may start to clamp the gate voltage of the PMOS P4, so that a larger voltage difference may appear between the gate and source of the PMOS P4, which turns on the switch SW4 formed by the PMOS P4. As a result, the turned-on switch SW4 may raise the voltage level of the control terminal of the switch SW3 to approach the input voltage Vin, in order to turn off the switch SW3, which in turn controls the power supply path of the electronic device to be switched off. The over-voltage protection can thereby be achieved.

Figure 5:
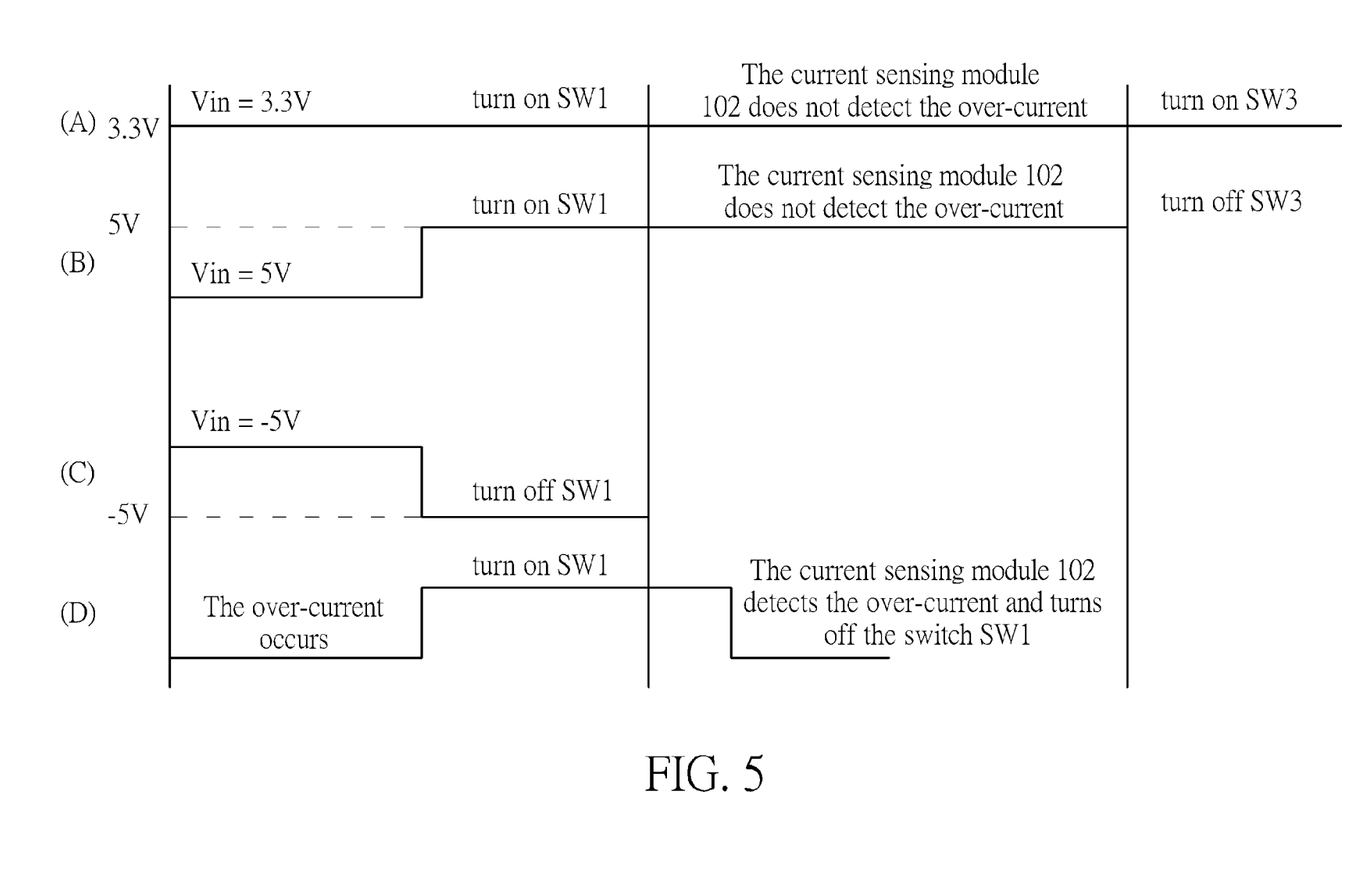
FIG. 5 is a schematic diagram of different voltages and currents entering the protection device according to an embodiment of the present invention.

The operations of the protection device 30 shown in FIG. 4 are illustrated in FIG. 5 and described as follows. Assume that the electronic device protected by the protection device 30 has a predetermined input voltage Vin equal to 3.3V with a specific tolerance (e.g., 3V-3.6V), and that the threshold voltages of the PMOSs P1, P3 and P4 are all equal to −1V and the diode Z1 is a zener diode having a zener voltage equal to 3.6V. When the input voltage Vin is equal to 3.3V and the over-current does not occur, the processing device 104 may output the control signal S_CTRL with a higher voltage level to turn on the switch SW2, in order to pull down the control terminal of the switch SW1 to zero-voltage (i.e., the gate voltage of the PMOS P1 is equal to 0V). In such a situation, the gate-to-source voltage Vgs of the PMOS P1 is equal to −3.3V, which is smaller than its threshold voltage −1V; hence, the PMOS P1 may be turned on to pass the input voltage Vin and the current. Then, the 3.3V input voltage Vin may make the source voltage of the PMOS P4 equal to 3.3V. Since the 3.3V input voltage is smaller than the 3.6V zener voltage of the diode Z1, the gate voltage of the PMOS P4 may also be equal to the input voltage 3.3V; hence, the gate-to-source voltage Vgs of the PMOS P4 is equal to 0V, which is greater than its threshold voltage −1V and thus turns off the PMOS P4. In such a situation, the control terminal of the switch SW3 is pull down to the zero voltage level via the pull-low resistor R_L (i.e., the gate voltage of the PMOS P3 is equal to 0V), so that the gate-to-source voltage Vgs of the PMOS P3 is equal to −3.3V, which is smaller than its threshold voltage −1V; hence, the PMOS P3 may be turned on to pass the input voltage Vin and the current, as the case of condition (A) shown in FIG. 5.

When the input voltage Vin is equal to 5V and the over-current does not occur, the processing device 104 may output the control signal S_CTRL with a higher voltage level to turn on the switch SW2, in order to pull down the control terminal of the switch SW1 to zero-voltage (i.e., the gate voltage of the PMOS P1 is equal to 0V). In such a situation, the gate-to-source voltage Vgs of the PMOS P1 is equal to −5V, which is smaller than its threshold voltage −1V; hence, the PMOS P1 may be turned on to pass the input voltage Vin and the current. Then, the 5V input voltage Vin may make the source voltage of the PMOS P4 equal to 5V. Since the 5V input voltage is greater than the 3.6V zener voltage of the diode Z1, the gate voltage of the PMOS P4 is clamped to 3.6V by the diode Z1; hence, the gate-to-source voltage Vgs of the PMOS P4 is equal to −1.4V, which is smaller than its threshold voltage −1V and thus turns on the PMOS P4. In such a situation, the control terminal of the switch SW3 is pull up to the level of the input voltage Vin via the switch SW4 (i.e., the gate voltage of the PMOS P3 is equal to 5V), so that the gate-to-source voltage Vgs of the PMOS P3 is equal to 0V, which is greater than its threshold voltage −1V; hence, the PMOS P3 may be turned off to prevent the excessively high input voltage Vin from passing through, in order to realize the over-voltage protection mechanism, as the case of condition (B) shown in FIG. 5.

When the input voltage Vin is equal to −5V and the over-current does not occur, the processing device 104 may output the control signal S_CTRL with a higher voltage level to turn on the switch SW2, in order to pull down the control terminal of the switch SW1 to zero-voltage (i.e., the gate voltage of the PMOS P1 is equal to 0V). In such a situation, the gate-to-source voltage Vgs of the PMOS P1 is equal to 5V, which is greater than its threshold voltage −1V; hence, the PMOS P1 may be turned off to prevent the excessively low input voltage Vin from passing through, in order to realize the negative voltage protection mechanism, as the case of condition (C) shown in FIG. 5.

When the input voltage Vin is equal to 3.3V and the over-current occurs, the input voltage Vin and the input current may pass through the switch SW1 (i.e., the PMOS P1). Afterwards, the current sensing module 102 detects the over-current, so that the processing device 104 may output the control signal S_CTRL with a lower voltage level to turn off the switch SW2. At this moment, the pull-high resistor R_H may pull up the control terminal of the switch SW1 to a higher voltage level (i.e., the gate voltage of the PMOS P1 is equal to 3.3V). In such a situation, the gate-to-source voltage Vgs of the PMOS P1 is equal to 0V, which is greater than its threshold voltage −1V; hence, the PMOS P1 may be turned off to prevent the excessively large current from passing through, in order to realize the over-current protection mechanism, as the case of condition (D) shown in FIG. 5.

Please note that the protection device and method of the present invention may integrate the over-current protection, over-voltage protection and negative voltage protection functionalities. Those skilled in the art can make modifications and alternations accordingly. For example, the above protection device 30 performs detection and protection in an order of the negative voltage protection, over-current protection and over-voltage protection, but in other embodiments, the protection order may be arbitrarily adjusted according to system requirements. For example, the over-voltage protection may be performed before the over-current protection and negative voltage protection, which is not limited herein. In addition, the switches SW1 and SW3 located on the power supply path are both implemented by a PMOS as the switch element, but in other embodiments, the NMOS may also be applied as the switch element in order to reduce the internal resistance of the switch or comply with other requirements, where the voltage of the control signal should be adjusted according to characteristics of the NMOS (e.g., generating the control signal by voltage boosting). In an embodiment, the bipolar junction transistor (BJT) may be utilized to realize the switches SW2 and SW4, which is not limited herein. Furthermore, in the above embodiments, the control signal S_CTRL corresponding to over-current protection is outputted to the control module 106 to control the switch SW1, in order to realize the over-current protection mechanism. In another embodiment, the control signal S_CTRL may be outputted to the control module 302 to control the switch SW3 in order to realize the over-current protection mechanism; that is, the over-voltage protection and over-current protection may share the same switch. More specifically, the number and disposition of switches for different protection mechanisms may be arbitrarily combined or arranged according to system requirements, which is not limited herein.

Figure 6:
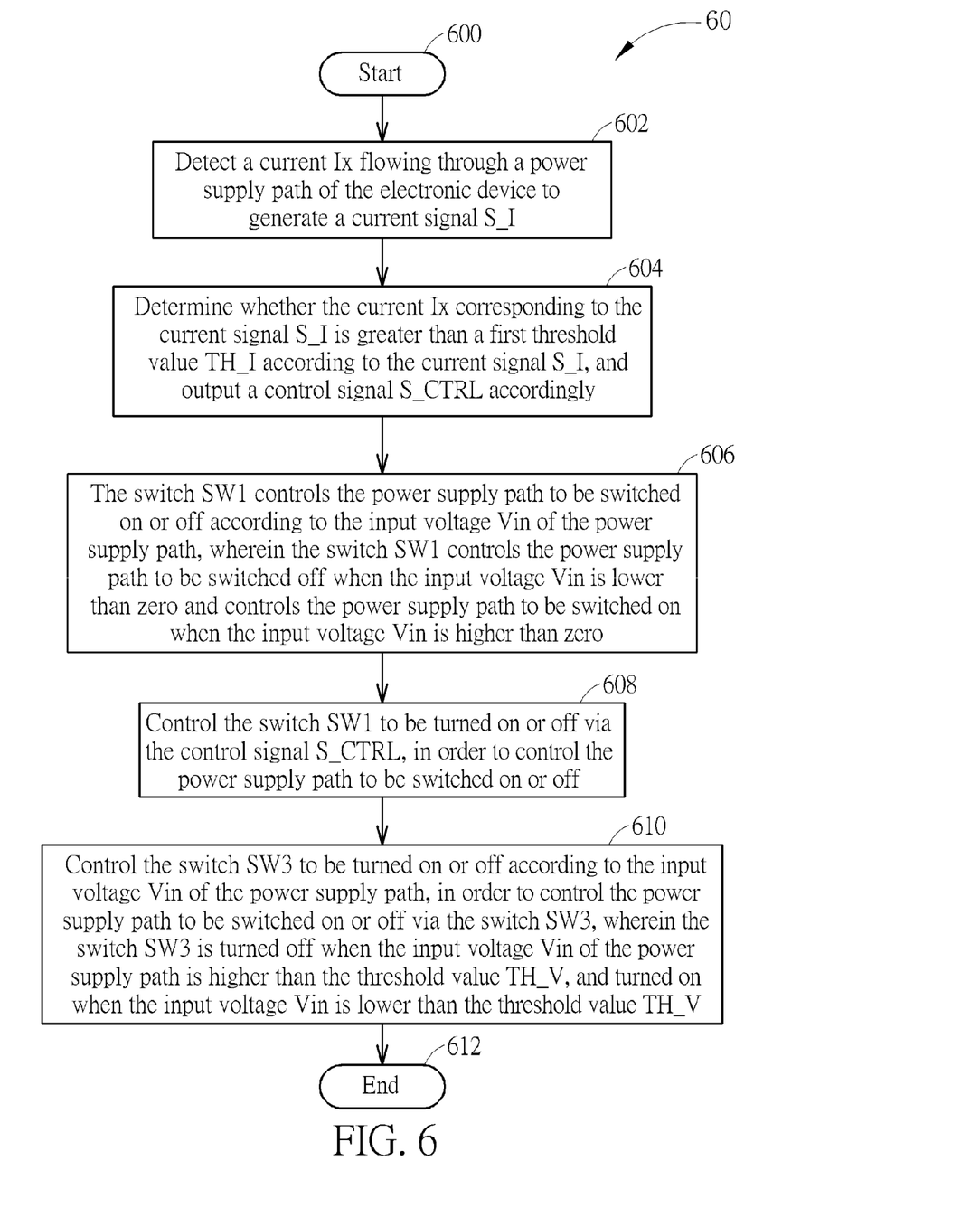
FIG. 6 is a schematic diagram of a protection process according to an embodiment of the present invention.

The abovementioned operations related to the protection device 30 may be summarized into a protection process 60, as shown in FIG. 6. The protection process 60 includes the following steps:

Step 600: Start.

Step 602: Detect a current Ix flowing through a power supply path of the electronic device to generate a current signal S_I.

Step 604: Determine whether the current Ix corresponding to the current signal S_I is greater than a first threshold value TH_I according to the current signal S_I, and output a control signal S_CTRL accordingly.

Step 606: The switch SW1 controls the power supply path to be switched on or off according to the input voltage Vin of the power supply path, wherein the switch SW1 controls the power supply path to be switched off when the input voltage Vin is lower than zero and controls the power supply path to be switched on when the input voltage Vin is higher than zero.

Step 608: Control the switch SW1 to be turned on or off via the control signal S_CTRL, in order to control the power supply path to be switched on or off.

Step 610: Control the switch SW3 to be turned on or off according to the input voltage Vin of the power supply path, in order to control the power supply path to be switched on or off via the switch SW3, wherein the switch SW3 is turned off when the input voltage Vin of the power supply path is higher than the threshold value TH_V, and turned on when the input voltage Vin is lower than the threshold value TH_V.

Step 612: End.

The detailed operations and alternations of the protection process 60 can be referred to the above description, and will not be narrated hereinafter.

In the prior art, the over-voltage or negative voltage protection circuit cannot simultaneously provide over-current protection functions; hence, the portable electronic device should be externally connected to a PTC thermistor or recoverable fuse for over-current protection. However, the PTC thermistor and the recoverable fuse have a greater internal resistance, which may generate a high temperature after the protection circuits are switched on and off many times. When the system has a larger load, the current flowing through the PTC thermistor or recoverable fuse may increase and generate a greater voltage drop, which easily generates an evil influence on the system. In comparison, the protection device and method of the present invention integrate the over-current protection, over-voltage protection and negative voltage protection functionalities. The applied current sensing elements have a smaller internal resistance and are not easily influenced by temperature, so that an excessive voltage drop may not occur even if the electronic device undergoes long usage or a lot of switches causing its temperature to rise.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A protection device, for protecting an electronic device, the protection device comprising:
a current sensing module, for detecting a current flowing through a power supply path of the electronic device to generate a current signal;

a processing device, coupled to the current sensing module, for receiving the current signal to determine whether the current corresponding to the current signal is greater than a first threshold value and outputting a control signal accordingly;

a first switch, disposed on the power supply path, for controlling the power supply path to be switched on or off according to an input voltage of the power supply path;

a first control module, coupled to the processing device and the first switch, for controlling the first switch to be turned on or off according to the control signal outputted by the processing device, in order to control the power supply path to be switched on or off to perform an over-current protection;

a second switch, disposed on the power supply path, for controlling the power supply path to be switched on or off; and a second control module, coupled to the second switch, for controlling the second switch to be turned on or off according to the input voltage of the power supply path, the second control module comprising:
a third switch, for receiving the input voltage; and
a pull-low resistor, for controlling the second control module to output a low-voltage-level signal when the third switch is turned off, in order to turn on the second switch;

wherein the over-current protection and a negative voltage protection control the first switch in common.

2. The protection device of claim 1, wherein the first switch controls the power supply path to be switched off when the input voltage is low than a second threshold value, and controls the power supply path to be switched on when the input voltage is higher than the second threshold value.

3. The protection device of claim 1, wherein the control signal instructs the first control module to turn off the first switch when the current is greater than the first threshold value, and instructs the first control module to turn on the first switch when the current is smaller than the first threshold value.

4. The protection device of claim 1, wherein the current sensing module comprises:
a current sensing element, disposed on the power supply path, for detecting the current flowing through the power supply path; and
a current determination circuit, coupled to the current sensing element, for generating the current signal according to the current detected by the current sensing element.

5. The protection device of claim 1, wherein the first control module comprises:
a fourth switch, for receiving the control signal, wherein the fourth switch controls the first control module to output a low-voltage-level signal when the control signal turns on the fourth switch, in order to turn on the first switch, which in turn controls the power supply path to be switched on; and
a pull-high resistor, for controlling the first control module to output a high-voltage-level signal when the control signal turns off the fourth switch, in order to turn off the first switch, which in turn controls the power supply path to be switched off.

6. The protection device of claim 1, wherein the second control module turns off the second switch when the input voltage of the power supply path is higher than a third threshold value, and turns on the second switch when the input voltage is lower than the third threshold value.

7. The protection device of claim 1, wherein the second control module further comprises:
a diode, coupled to a control terminal of the third switch, for clamping a voltage of the control terminal when the input voltage is higher than the third threshold value, in order to turn on the third switch, so that the input voltage is converted into a high-voltage-level signal to turn off the second switch.

8. The protection device of claim 1, wherein each of the first switch and the second switch is a p-type metal oxide semiconductor field-effect transistor.

9. A protection method for an electronic device, comprising:
detecting a current flowing through a power supply path of the electronic device to generate a current signal;
determining whether the current corresponding to the current signal is greater than a first threshold value according to the current signal, and outputting a control signal accordingly;
controlling, by a first switch, the power supply path to be switched on or off according to an input voltage of the power supply path;
controlling the first switch to be turned on or off via the control signal, in order to control the power supply path to be switched on or off to perform an over-current protection; and
controlling a second switch to be turned on or off according to the input voltage of the power supply path, in order to control the power supply path to be switched on or off via the second switch;
wherein the over-current protection and a negative voltage protection control the first switch in common;
wherein the step of controlling the second switch to be turned on or off according to the input voltage of the power supply path in order to control the power supply path to be switched on or off via the second switch comprises:
receiving, by a third switch, the input voltage; and
outputting a low-voltage-level signal via a pull-low resistor when the third switch is turned off, in order to turn on the second switch, which in turn controls the power supply path to be switched on.

10. The protection method of claim 9, wherein the first switch controls the power supply path to be switched off when the input voltage is lower than a second threshold value, and controls the power supply path to be switched on when the input voltage is higher than the second threshold value.

11. The protection method of claim 9, wherein the control signal instructs the first switch to be turned off when the current is greater than the first threshold value, and instructs the first switch to be turned on when the current is smaller than the first threshold value.

12. The protection method of claim 9, wherein the step of detecting the current flowing through the power supply path of the electronic device to generate the current signal comprises:
detecting, by a current sensing element, the current flowing through the power supply path; and
generating, by a current determination circuit, the current signal according to the current detected by the current sensing element.

13. The protection method of claim 9, wherein the step of controlling the first switch to be turned on or off via the control signal in order to control the power supply path to be switched on or off comprises:
receiving, by a fourth switch, the control signal;

outputting a low-voltage-level signal via the fourth switch when the control signal turns on the fourth switch, in order to turn on the first switch, which in turn controls the power supply path to be switched on; and outputting a high-voltage-level signal via a pull-high resistor when the control signal turns off the fourth switch, in order to turn off the first switch, which in turn controls the power supply path to be switched off.

14. The protection method of claim 9, further comprising:

turning off the second switch when the input voltage of the power supply path is higher than a third threshold value; and turning on the second switch when the input voltage is lower than the third threshold value.

15. The protection method of claim 9, wherein the step of controlling the second switch to be turned on or off according to the input voltage of the power supply path in order to control the power supply path to be switched on or off via the second switch further comprises:

clamping a voltage of a control terminal of the third switch when the input voltage is higher than the third threshold value, in order to turn on the third switch, so that the input voltage is converted into a high-voltage-level signal to turn off the second switch, which in turn controls the power supply path to be switched off.

16. The protection method of claim 9, wherein each of the first switch and the second switch is a p-type metal oxide semiconductor field-effect transistor.

* * * * *